A. MUEHLMATT.
BORING HEAD FOR LATHES, MILLING MACHINES, AND THE LIKE.
APPLICATION FILED APR. 14, 1910.
973,542. Patented Oct. 25, 1910.
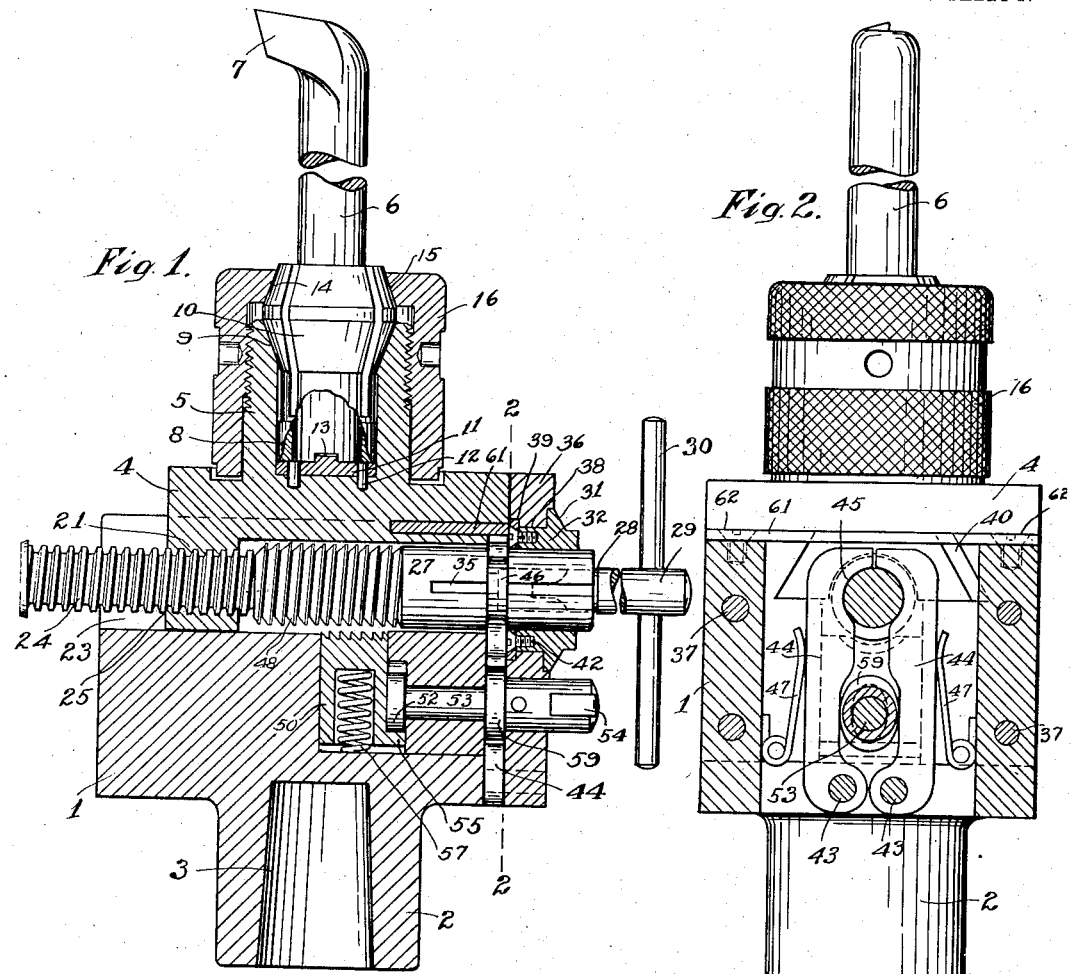

A. MUEHLMATT.
BORING HEAD FOR LATHES, MILLING MACHINES, AND THE LIKE.
APPLICATION FILED APR. 14, 1910.
973,542.
Patented Oct. 25, 1910.
2 SHEETS—SHEET 2.
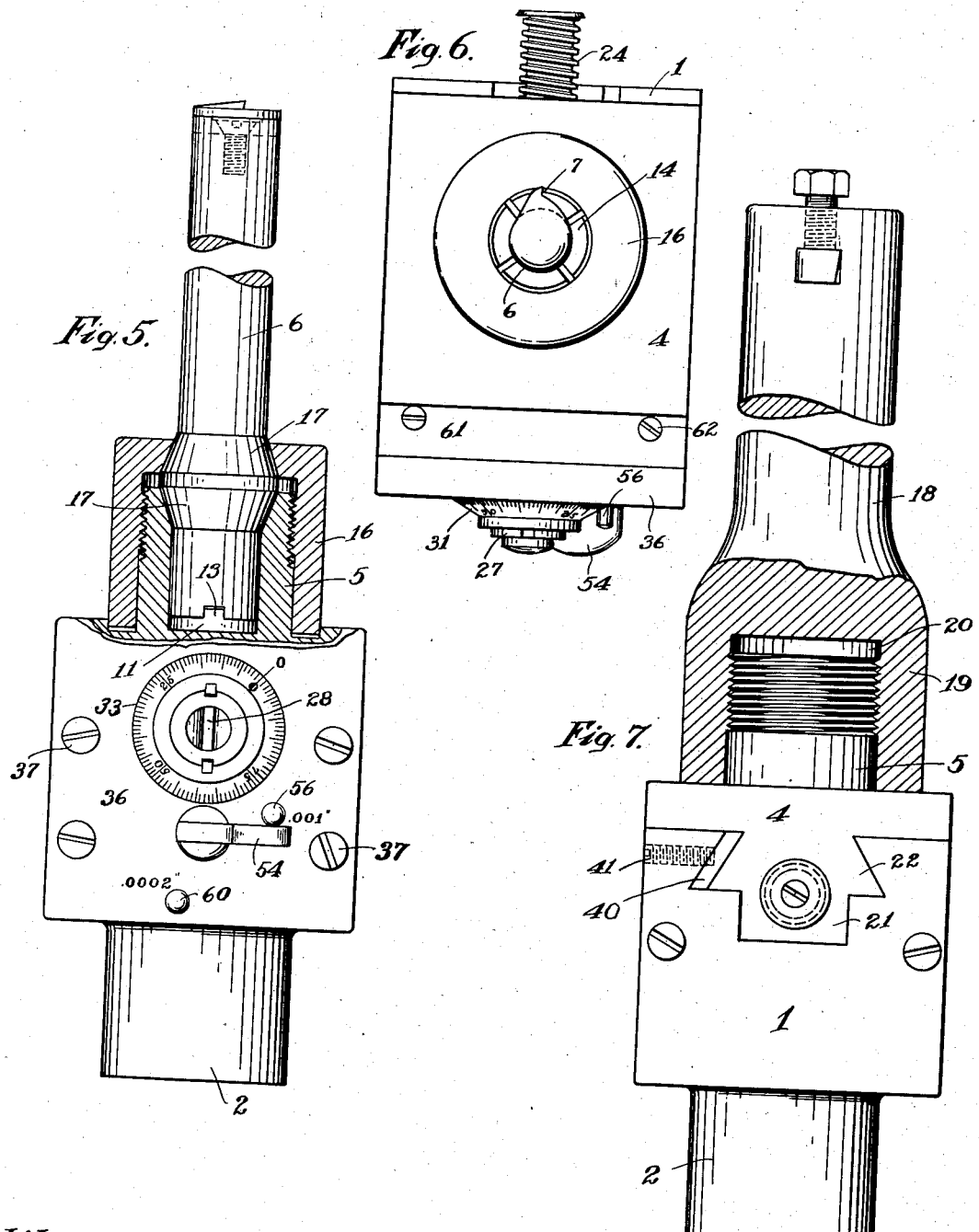
Witnesses
Earl W. Griffin
N. Smith
Inventor
Adolph Muehlmatt
by Alfred M. Allen
Attorney

UNITED STATES PATENT OFFICE.

ADOLPH MUEHLMATT, OF NEWPORT, KENTUCKY.

BORING-HEAD FOR LATHES, MILLING-MACHINES, AND THE LIKE.

973,542.   Specification of Letters Patent.   Patented Oct. 25, 1910.

Application filed April 14, 1910. Serial No. 555,389.

*To all whom it may concern:*

Be it known that I, ADOLPH MUEHLMATT, a citizen of the United States, and a resident of the city of Newport, in the county of Campbell and State of Kentucky, have invented certain new and useful Improvements in Boring-Heads for Lathes, Milling-Machines, and the Like, of which the following is a full, clear, and exact description, reference being had to the accompanying drawing, forming a part of this specification.

The object of my invention is to provide a boring head for cutting tools in which the tool may be advanced for successive operations by the movement of the adjusting screw either over comparatively long distances or very minutely with each adjustment, and at the same time the distance traveled may be accurately measured and determined on the graduated dial or scale employed to indicate the movement of the adjusting screw.

While I have illustrated my invention in connection with a boring head for lathes and the like, it will be obvious from the following description and claims that the general principles of the invention may be readily applied to the adjustment of all sorts of tools and appliances in which a relatively fixed and a relatively movable plate or holder are arranged to be adjusted with reference to each other by means of an adjusting screw normally held in fixed relation on the one member and adapted to advance or retract the other member by the rotation of the screw therein.

The invention consists, broadly considered, in providing the adjusting screw for members to be adjusted with reference to each other, with a series of threads of different pitch and in connection therewith providing means either for holding the screw in fixed relation to the relatively fixed member while permitting the screw to advance or retract the other member by screw threaded engagement therewith, or for holding the screw with the screw threads of one pitch in engagement with the relatively fixed member, and the screw threads of the other pitch in engagement with the other member, whereby with the rotation of the screw, the member to be adjusted will advance or retract on the screw while at the same time the screw itself with reference to said member will retract or advance and the actual movement of the member to be adjusted with reference to the fixed member will be equal to the difference between the advancement on the screw and the retraction of the screw.

In the drawings, Figure 1 is a central longitudinal section of my improved device. Fig. 2 is a cross section taken on the line 2, 2, of Fig. 1. Fig. 3 is a central longitudinal section of a portion of the head, with the parts arranged for minute adjustment of the cutting tool. Fig. 4 is a cross section on the line 4, 4, of Fig. 3. Fig. 5 is a plan view partly in section, with the key wrench for the adjusting screw removed. Fig. 6 is an end view looking toward the cutting tool as shown in Fig. 1. Fig. 7 is a plan view as shown in Fig. 5 taken from the opposite side.

1 is the main body portion of a boring head to which my invention is applied, provided with a boss 2 and socket 3, by means of which the head is secured to the spindle of a lathe, or milling head, or otherwise as the case may be.

4 is the sliding body or plate of the head provided with the usual nose 5, to receive and hold the cutting tool 6, with its cutting edge 7. The nose is provided with a central bore or recess 8, with its inner surface flared outwardly or beveled at 9 to receive the flared portion of the ordinary tool holding chuck 10. To hold the chuck from turning, I secure a washer 11 in the base of the recess by the pins 12, and this washer is provided with a tang 13 to seat itself in a corresponding radial groove in the lower edge of the annular chuck and also in the bottom face of the tool 6. The chuck itself is slotted lengthwise to form the holding members 14, 14, which embrace the tool, and the outer faces of these arms 14 are beveled to engage the beveled surface 9 on the nose, and beveled in the opposite direction at 15 to engage the corresponding surface around the aperture in the cap 16. This cap is screw threaded on the nose 5 and the tightening up of the cap causes the chuck to engage and hold the tool. Of course, any desired tool may be thus secured to the head, but the method of holding the tool forms no part of my invention. Sometimes the tool itself, as illustrated in Fig. 5, may be provided with conical raised portions 17, 17, and the chuck may be dispensed with, or the shank 19 of the tool itself or of a tool holder 18 (Fig. 7)

may be formed with an interiorly threaded socket 20 to be screwed directly on the nose.

The sliding portion 4 of the boring head is mounted on the body portion 1 in any convenient way. The preferred method is as shown, in which the base of the slide 4 is provided with a tongue 21, beveled at 22 on the sides and seated in a correspondingly beveled groove 23 in the face of the body, the usual gib 40 being provided for one of the beveled sliding surfaces, and the parts arranged to be locked by the set screw 41.

24 is the adjusting screw, the outer end of which is provided with screw threads 25 of such pitch as may be required, in the present instance ten threads to the inch. These threads engage a correspondingly threaded aperture in the tongue 21 of the sliding head 4, so that with the rotation of the screw, the sliding head will be advanced or retracted, the tongue being cut away at 26 to allow for considerable movement of the slide.

The shank 27 of the adjusting screw is cylindrical and passes loosely through a suitable aperture in the main body 1 of the head, and the screw is provided with any suitable means for turning it; in the present instance, the head of the screw is provided with a tang 28 to receive a corresponding socket in a removable key wrench 29 having handles 30.

Mounted on the shank 27 of the screw is the annular dial 31 formed with a sleeve 32 to fit around the screw. The dial plate is provided on its outer surface with a graduated scale 33. The dial plate is provided with feathers 34 which engage in splines 35 in the screw shank so that the dial turns with the screw, while permitting the screw to slide through the dial plate.

36 is the cover plate which is suitably secured to the face of the main body 1 of the head, in the present instance by four screws 37. The collar 32 of the dial plate is seated in a suitable opening in this cover plate, and the collar is provided with an annular groove to receive the tongue 38 on the cover plate around the dial opening in the cover plate. An annular plate 39 is secured by screws 42 to the collar 32 from the rear side of the cover plate and the dial plate is thus secured to the cover plate and to the main body 1 of the head, while the dial is allowed to rotate in the cover plate.

Pivotally mounted by the pins 43 on the main body 1 in a recess between the cover plate 36 and the body are a pair of leaves 44, 44, and the forward ends of these leaves are formed into segments 45, 45, to engage within an annular groove 46 in the shank 27 of the adjusting screw and these leaves are normally held in this engagement by the springs 47, 47. With these leaves engaging the screw, it will be evident that the screw will be held in fixed relation to the main body 1 of the boring head, and that upon turning the screw, the sliding head 4 carrying the tool will be advanced or retracted to the extent indicated on the graduated dial. If this scale is divided into one hundred points and the pitch of the screw is ten, the movement of the screw over one point in the scale will move the sliding plate one thousandth of an inch.

Intermediate the shank 27 of the screw and the ten pitch threads 25, the screw is provided with a second threaded portion 48, which, in the present instance, is twelve and one-half pitch. Seated in a socket 49 in the main body 1 adjacent to this screw threaded portion, is a block or nut 50, the face of which nut, adjacent to the screw, is correspondingly screw threaded at 51. This nut 50 is normally held out of engagement with the screw by a cam 52 on the inner end of a cam pin 53 seated in the main body and extending through the cover plate where the pin is provided with a handle 54. The cam 52 engages a flange or extension 55 on the nut and with the handle 54 in the position shown in Fig. 5 with the handle against the stop pin 56, the cam is in engagement with the flange of the nut to hold it out of engagement with the screw and holding the nut against the pressure of the coiled spring 57 seated in a socket 58 in the under surface of the nut and bearing between the nut and the main body 1. The cam pin passes between the two leaves 44, 44, and between these leaves the pin carries a second cam 59 set with its longitudinal axis parallel with the nut engaging cam 52. When the cam 52 is in position to engage the nut 50, the cam 59 lies parallel to the leaves 44, and these leaves engage the groove in the adjusting screw. When the handle of the cam pin 53 is given a quarter turn to a position against the stop 60, the cams 52 and 59 will be turned at right angles to their former position, the leaves 44, 44 will be spread apart to release the adjusting screw, and the nut will be released to permit the spring 57 to force the nut into engagement with the screw. Under this condition, when the adjusting screw is now rotated, the screw threads 25 will drive the sliding head as before, but inasmuch as the nut 50 remains in fixed position in the relatively fixed head, the screw itself will move in the opposite direction.

If the pitch of the screw 25 were the same as the pitch of the screw at 48, the sliding head would not advance at all with reference to the fixed head, but inasmuch as the pitch of the screw at 48 is, in the present instance, twelve and one-half the sliding head will advance the difference between the movements caused by the two pitches. For one point on the scale, the advance will be the difference between .001 and .0008 or .0002 of an inch, i. e. one-fifth of the former movement. The same scale can be used in either of the two adjustments to determine the amount advanced or retracted. In the one case, the movement for each point on the scale will be one-fifth of the movement in the other case.

Of course it will be evident that by varying the comparative pitches of the two parts of the adjusting screw, greater or more minute movements and adjustment may be provided, all within the spirit of my invention. It will also be evident that the broad principles of my invention may be readily applied to the adjustment of a movable member with reference to a relatively fixed member by an adjusting screw in a great variety of tools and appliances without departing from the spirit of my invention.

In order to prevent chips and dirt falling into the working parts when the sliding head is shifted away from the cover plate 36, I secure a plate 61 by the screws 62 over the opening in the main body and form a slot 63 in the sliding head to receive this plate.

Having thus described my invention, what I claim as new and desire to secure by Letters Patent, is:—

1. In a device of the character specified, a relatively fixed member and a movable tool carrying member and an adjusting screw in engagement with both members, said screw provided with threads of different pitches, and means for throwing one of said screw threads into and out of engagement with one member, while maintaining the screw threaded engagement with the other member.

2. In a device of the character specified, a relatively fixed member and a movable tool carrying member and an adjusting screw, means for retaining said screw in fixed position with relation to the fixed member, said screw provided with threads of different pitches, with one set of which said movable member is permanently engaged, a movable device relatively fixed to the fixed member to engage the second set of screw threads, means for releasing the retaining device for the screw, and means for throwing said movable device into engagement with said screw.

3. In a device of the character specified, a relatively fixed body portion, and a sliding tool carrying member, with an adjusting screw in engagement with the tool carrying member, means for retaining said screw in fixed position with relation to the body portion, a second set of screw threads for said screw of different pitch from those in engagement with the tool carrying plate, a movable device to engage said second set of screw threads said device being mounted in said body portion, and means for releasing said screw retaining device and to simultaneously throw said movable device into engagement with the second set of screw threads.

4. In a device of the character specified, a relatively fixed body portion and a sliding tool member with an adjusting screw in engagement with the tool carrying member, means for retaining said screw in fixed position with relation to the body portion, a second set of screw threads for said screw of different pitch from those in engagement with the tool carrying plate, a movable block with threads to engage said second set of screw threads, said block mounted in a recess in said body portion, with spring to enforce said engagement, and means for releasing the retaining device for the screw and simultaneously releasing said block to permit the block to engage the screw.

5. In a device of the character specified, a relatively fixed body portion and a sliding tool member with an adjusting screw in engagement with the tool carrying member, means for releasing said screw in fixed position with relation to the body portion, a second set of screw threads for said screw of different pitch from those in engagement with the tool carrying plate, a movable block with threads to engage said second set of screw threads, said block mounted in a recess in said body portion, with spring to enforce said engagement, and a cam pin with a pair of cams, one adapted to engage said retaining device and the other to engage said block, said cams so mounted that the block and retaining device will be simultaneously acted upon with the adjustment of the cams to release the retaining device, and to permit the block to engage the screw.

6. In a device of the character specified, a relatively fixed body portion and a sliding tool carrying member with an adjusting screw in engagement with the tool carrying member, a pair of leaves pivotally mounted on the body portion with annular groove in said screw with which the leaves engage, a second set of screw threads for said screw of different pitch from those in engagement with the tool carrying member, a movable device relatively fixed to the fixed body portion to engage the second set of screw threads, means for shifting the leaves from engagement with the screw, and means for throwing the said movable device into engagement with said screw.

7. In a device of the character specified, a relatively fixed body portion and a sliding tool carrying member with an adjusting screw in engagement with the tool carrying member, a pair of leaves pivotally mounted on the body portion with annular groove in said screw with which the leaves engage, a second set of screw threads for said screw of different pitch from those in engagement with the tool carrying member, a movable device relatively fixed to the fixed body portion to engage the second set of screw threads, a pair of cams and means for actuating same, one adapted to engage said leaves and the other to engage the movable device so mounted that the movable device and leaves will be simultaneously acted upon with the adjustment of the cams to withdraw the leaves from engagement with the screw and to permit the movable device to engage the screw.

8. In a device of the character specified, a relatively fixed body portion and a sliding tool carrying member with an adjusting screw in engagement with the tool carrying member, a pair of leaves pivotally mounted on the body portion with annular groove in said screw with which the leaves engage, and springs to enforce the engagement, a second set of screw threads for said screw of different pitch from those in engagement with the tool carrying plate, a movable block with threads to engage said second set of screw threads, said block mounted in a recess in said body portion, with spring to enforce said engagement, a cam pin, with pair of cams, one adapted to engage said leaves and the other to engage said block, said cams so mounted that the block and leaves will be simultaneously acted upon with the adjustment of the cams, to withdraw the leaves from engagement with the screw and to permit the block to engage the screw.

ADOLPH MUEHLMATT.

Witnesses:
ROBERT P. HAIGETT,
K. SMITH.